Sept. 20, 1932.  H. E. BUCKLEN  1,878,816
IMPELLER
Original Filed Dec. 30, 1925
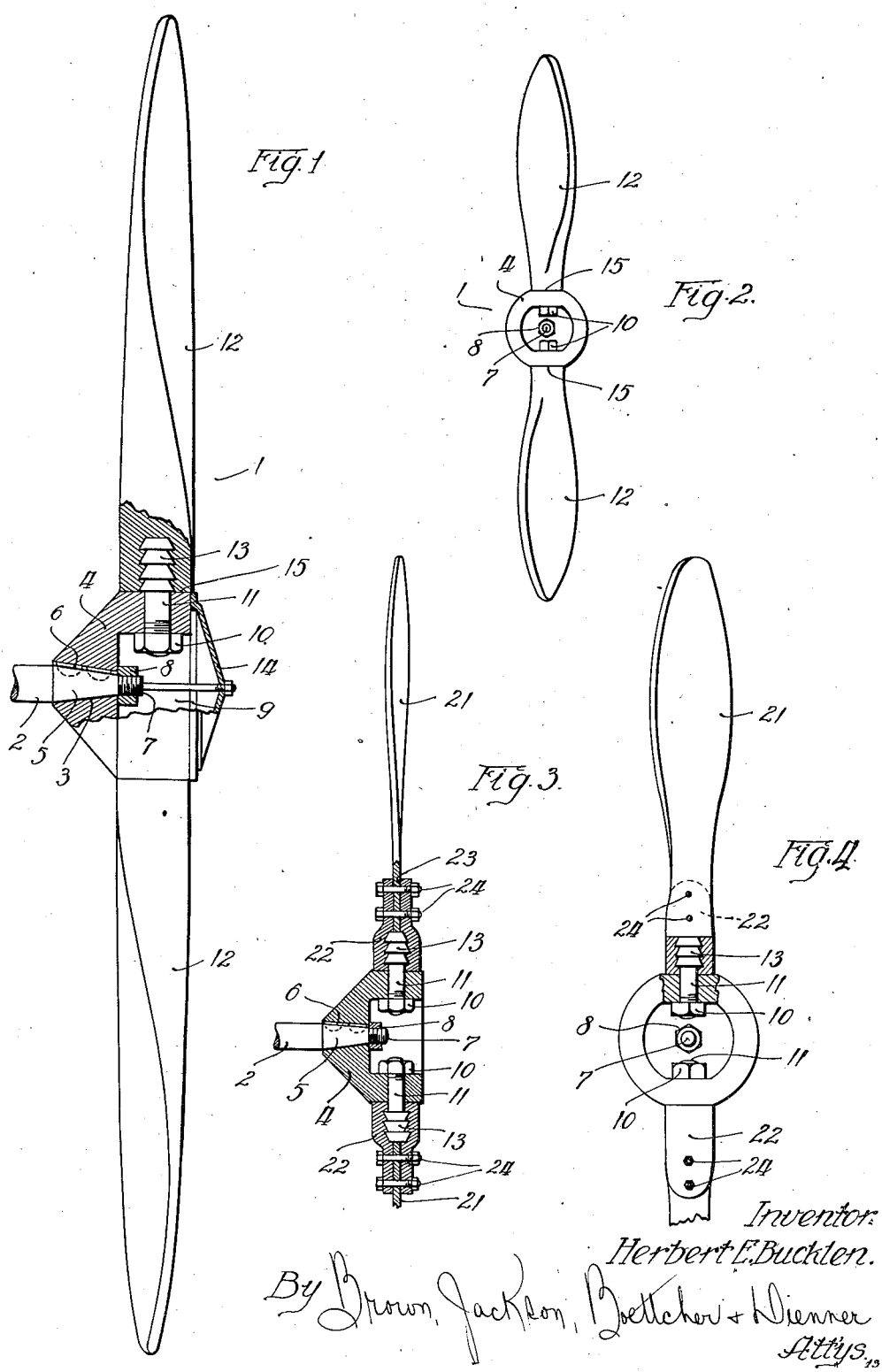
Inventor:
Herbert E. Bucklen.
By Brown, Jackson, Boettcher + Dienner
Attys.

Patented Sept. 20, 1932

1,878,816

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

IMPELLER

Original application filed December 30, 1925, Serial No. 78,275. Divided and this application filed December 28, 1928. Serial No. 328,883.

This application is a division of my pending application, serial number 78,275, filed December 30, 1925.

This invention relates to impellers or propellers, and more specifically to the manner of attaching or securing the individual blade or blades to the hub section. While the impellers here shown are particularly adapted for use as wind driven devices to extract power from the wind, the invention is not limited thereto and is applicable alike to impellers and propellers driven by the wind as in a windmill or against the air as in an aeroplane propeller, and is also applicable to like devices disposed in a fluid stream other than air.

It is a particular object of the present invention to provide a novel means for securing the blades to the hub so that the individual blades are angularly adjustable with respect to the hub so that the blades may be adjusted to secure the proper relationship between the impeller and the other parts associated therewith as may be necessary under varying conditions.

The attainment of the above and further objects of the invention will be apparent from the following specification taken in conjunction with the accompanying drawing forming a part thereof.

In the drawing;

Fig. 1 is a side elevational view partly in section showing my improved impeller and the method of securing it to the hub;

Fig. 2 is a front view of the impeller shown in Fig. 1;

Fig. 3 is a side elevation partly in section showing the construction of a modified form of a wheel or impeller; and Fig. 4 is a front view partly in section of the same.

Referring now more particularly to the impeller shown in Figs. 1 and 2, the impeller 1 which serves as a turbine wheel, is secured to the shaft 2 by means of a tapered socket 3 in the hub member 4, said tapered or conical socket fitting upon the conical shank 5 of the shaft 2. These parts are keyed together, as indicated at 6, and the two tapered parts are held against axial displacement with respect to one another by means of the stud 7 formed on the forward part of the tapered portion 5 and the nut 8 which bears against the hub 4. The hub 4 has a recess 9 in which are disposed first, the jam nut 8 for holding the hub on the impeller shaft 2, and next, the clamping nut 10—10 which are threaded upon studs 11—11 which studs in turn are secured to the blade members 12—12.

The blade members 12—12 are in the present case made of duralumin or aluminum casting with the upper ends or heads 13 of the studs cast in the hub or base portion of the blade 12. These heads 13 are preferably provided with a series of shoulders to secure a firm grip of the studs upon the hubs of blades.

The recess in the hub is preferably closed by a suitable cap or cover 14, although this may be omitted, if desired. It is to be noted that the bases of the blades 12 are seated on seats 15 which are normal to the axes of the blades 12. To adjust the angular position of the blades with respect to the axis of rotation, which is the center of the shaft 2, it is only necessary to loosen the clamping nuts 10. When the clamping nuts 10 are loosened, the blades 12 may be turned angularly about the center of the studs 11 as an axis, and when they are brought into the proper position, they may be rigidly secured in place by tightening the clamping nuts 10.

In Figures 2 and 3, I have illustrated a modified form of impeller in which the blades 21 are made of thin metal of uniform or substantially uniform thickness, such as sheet metal plates, these plate blades being secured at their ends in bases 22. The bases 22 are slotted at their outer end as indicated at 23 to receive the base of the blades, a pair of clamping bolts passing through the metal on each side of the slot and through holes in the blades.

In this way the impeller is built up more economically and at greater facility of manufacture than by forming the blade in a single unitary piece or forming the impeller itself as a complete unit. The blades are adjustable to provide a proper angular setting in the wind in the same manner as are the blades shown in Figures 1 and 2 as previously described.

It is to be noted that the impeller shown in Figures 1 and 2, as well as that shown in Figures 3 and 4 is of the helical screw type similar to aeroplane propellers.

The sheet metal impeller shown in Figures 3 and 4 being made of thin metal has an appreciable amount of flexibility when built in large sizes. This is particularly advantageous in wind driven impellers for when the wind velocity or pressure upon the blade is below that necessary to drive the impeller at its rated speed, the impeller maintains its shape, whereas if the wind velocity or the pressure upon the impeller blades exceeds that necessary to drive the impeller at its rated speed, the pressure of the wind produces a certain amount of distortion of the blades, especially at or near the tip ends of the blades. This distortion tends to reduce the overall efficiency of the blade; that is, it reduces the ratio of the energy derived from the wind to the total energy present in the wind stream striking the impeller. This tends to prevent the impeller from speeding up to speeds greatly in excess of the rated speed during very high wind periods. As a result of this arrangement, there is a tendency to hold the speed of the shaft 2 down to its rated speed during excessively high wind storms.

In compliance with the requirements of the patent statutes, I have herein shown and described a few preferred embodiments of my invention. It is, however, to be understood that the invention is not limited to the precise constructions set forth, the same being merely illustrative of the invention. What I consider new and desire to secure by Letters Patent is:

1. In a propeller, a blade member comprising a base constituting a seat for the propeller and having a stud embedded therein to form an integral unit therewith and projecting axially therefrom, said base member being slotted, a sheet metal blade lying in said slots, the stud extending to and terminating substantially at the end of the slot, and bolts passing through the blade and the metal on each side of the slots.

2. A cast metal base member for mounting a propeller blade, said base having a slotted portion at one end for receiving a propeller blade in the slot, and a mounting stud embedded in the base member and extending from the opposite end thereof into the base member and toward the slot.

3. A base member for mounting a propeller blade, said base member having a portion at one end for receiving a propeller blade and having at the opposite end a mounting stud embedded therein, the portion of the stud within the base member having a shoulder for preventing withdrawal of the stud.

4. In combination, a base member for mounting a propeller blade, said base member having a portion at one end for receiving a propeller blade and having at the opposite end a mounting stud embedded therein, the portion of the stud within the base member having a shoulder for preventing withdrawal of the stud, the portion of the end of the base member surrounding the stud comprising a flat seating surface for seating on the hereinafter mentioned hub member, the outward projecting end of the stud being threaded, a hub member having a radially extending hole for receiving the outwardly extending portion of the stud for mounting the stud, said stud being adjustable about an axis extending radially of the hub, and clamping means for rigidly clamping the stud in its adjusted position.

5. A wind driven propeller for extracting power from the wind, said propeller comprising a plurality of relatively long and narrow flexible blade members mounted in a substantially vertical plane, a hub member upon which the blade members are adjustably mounted, said hub including a seat for each of the blade members, said hub member having a central open recess and a radial opening through each seat extending into the recess, the blade members each having a portion adapted to rest on the seat and a stud member extending through the opening into the recess, each blade member being rotatable on the seat about an axis radial of the hub, said stud members being threaded on the end within the recess, clamping nuts clamped on the ends of the studs within the recess for rigidly securing the blades to the hub in their adjusted position, said hub member having an opening for receiving a horizontal shaft, and means for keying the hub to the shaft to drive the shaft, said means including a clamping nut within the recess.

6. A cast metal propeller blade having a preformed mounting stud cast therein, said stud extending longitudinally of the blade from one end thereof.

7. A cast metal propeller blade having a preformed mounting stud cast therein to form an integral part thereof, said stud extending longitudinally of the blade from one end thereof, the end of the blade from which the stud extends constituting a seat for mounting the propeller.

8. Means for mounting a plurality of propeller blades comprising a hub member having a rearwardly projecting portion provided with a central opening for receiving a mounting shaft, the forward portion of the hub member having a central recess with the body of the hub member defining a circumferential flange around the recess, the outer periphery of the flange including a flat mounting seat for each blade, there being a radial opening extending through the flange to the recess centrally of each seat, each of the blade members having a portion adapted to rest on a mounting seat and a stud embedded in said portion and extending through the central opening in the seat member into the recess, and lock nuts on the inner ends of the studs, said lock nuts lying entirely within the recess and bearing against the inner side of the peripheral flange and serving to clamp the portion of the blades that rests on the mounting seats tightly against the mounting seats.

In witness whereof, I hereunto subscribe my name this 24 day of December, 1928.

HERBERT E. BUCKLEN.